US008733748B2

(12) United States Patent
Yu et al.

(10) Patent No.: US 8,733,748 B2
(45) Date of Patent: May 27, 2014

(54) CART WITH HEIGHT ADJUSTABLE TRAY

(75) Inventors: Chi-An Yu, Tu-Cheng (TW); Yan-Hao Li, Shenzhen (CN); Ri-Qing Chen, Shenzhen (CN); Xing Xia, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 489 days.

(21) Appl. No.: 13/097,099

(22) Filed: Apr. 29, 2011

(65) Prior Publication Data

US 2012/0187641 A1 Jul. 26, 2012

(30) Foreign Application Priority Data

Jan. 25, 2011 (CN) .......................... 2011 1 0026917

(51) Int. Cl.

| | |
|---|---|
| ***B23Q 3/00*** | (2006.01) |
| ***B66F 5/02*** | (2006.01) |
| ***B66F 5/04*** | (2006.01) |
| ***B66F 3/00*** | (2006.01) |
| ***B66F 3/08*** | (2006.01) |
| *A47C 3/40* | (2006.01) |

(52) U.S. Cl.

CPC ... *B66F 3/00* (2013.01); *B66F 3/08* (2013.01); *A47C 3/40* (2013.01)

USPC .............. 269/17; 269/16; 254/2 B; 254/10 B; 254/10 C

(58) Field of Classification Search

CPC ........................................................ B66F 3/00

USPC .................... 269/16, 17; 254/2 B, 10 B, 10 C

See application file for complete search history.

(56) References Cited

U.S. PATENT DOCUMENTS

| | | | | |
|---|---|---|---|---|
| 2,894,605 | A * | 7/1959 | Leavitt | 187/224 |
| 3,385,401 | A * | 5/1968 | Campbell et al. | 187/222 |
| 3,946,991 | A * | 3/1976 | Eriksson | 254/323 |
| 5,478,189 | A * | 12/1995 | Agtuca | 414/529 |
| 6,371,449 | B1 * | 4/2002 | Chamberlain | 254/10 C |

* cited by examiner

*Primary Examiner* — Lee D Wilson
*Assistant Examiner* — Seahee Yoon
(74) *Attorney, Agent, or Firm* — Novak Druce Connolly Bove + Quigg LLP

(57) ABSTRACT

A cart includes a frame body, a tray, a driving mechanism, and a transmission mechanism. The frame body includes a top portion, a bottom portion including a number of castors, and a number of connecting bars between the top portion and the bottom portion, which cooperatively defines a receiving space. The tray is configured to support a workpiece and to be slidably received in the receiving space. The transmission mechanism is connected between the tray and the driving mechanism to transmit the power of the driving mechanism to the tray to drive the tray to move in the receiving space.

9 Claims, 4 Drawing Sheets

CART WITH HEIGHT ADJUSTABLE TRAY

BACKGROUND

1. Technical Field

The present disclosure relates to carts, and especially to a cart with height adjustable tray.

2. Description of Related Art

Carts are often used to move heavy workpieces in a workshop. They are known to have an unadjustable surface for supporting workpieces. The inability to adjust the height level of the surface is inconvenient for workers when they want to load or unload workpieces from or to a position higher than the surface.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Embodiments of the present disclosure are now described in detail, with reference to the accompanying drawings.

Figure 1:
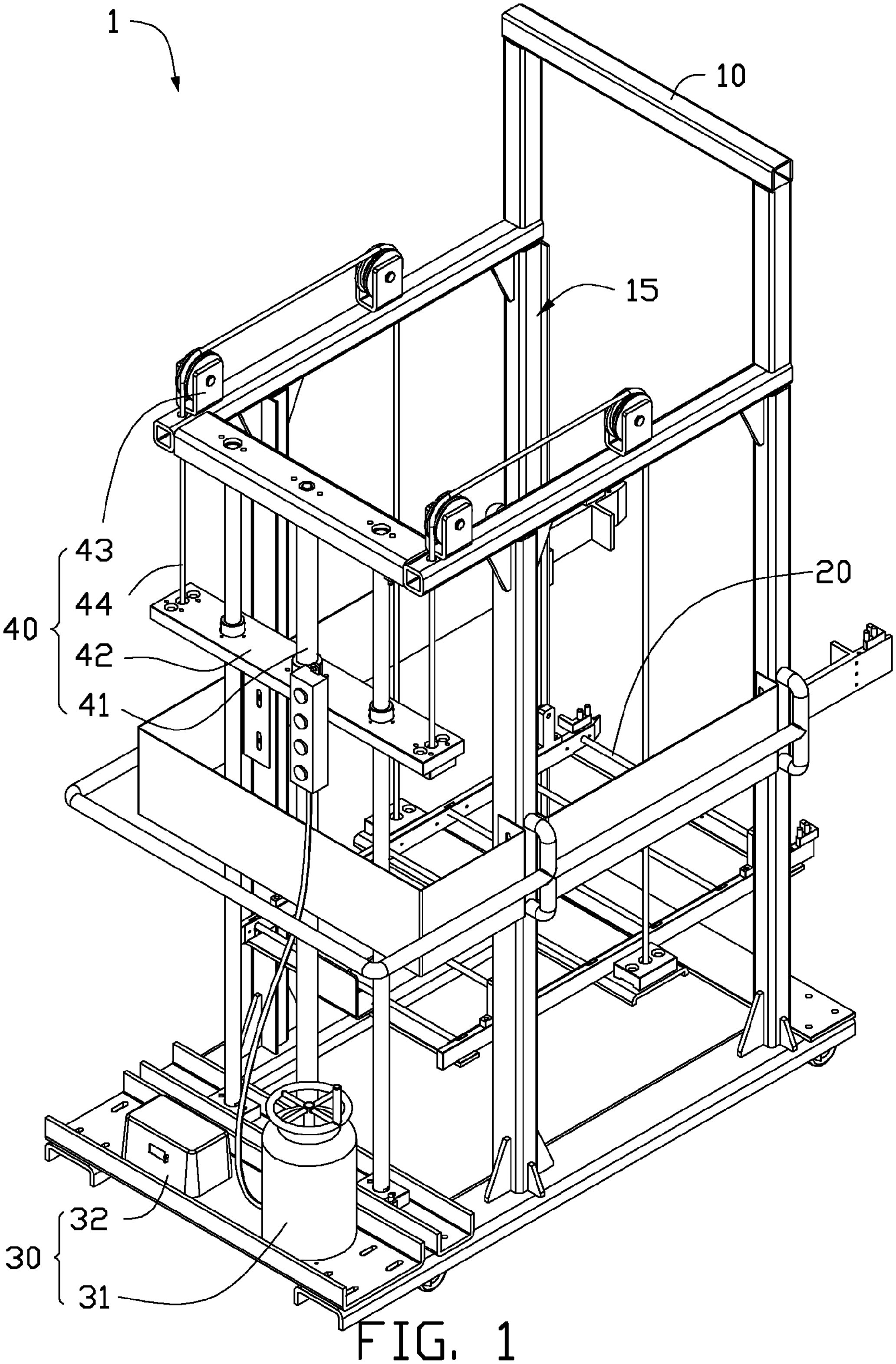
FIG. 1 is an isometric view of a cart with height adjustable tray, in accordance with an embodiment.
Figure 2:
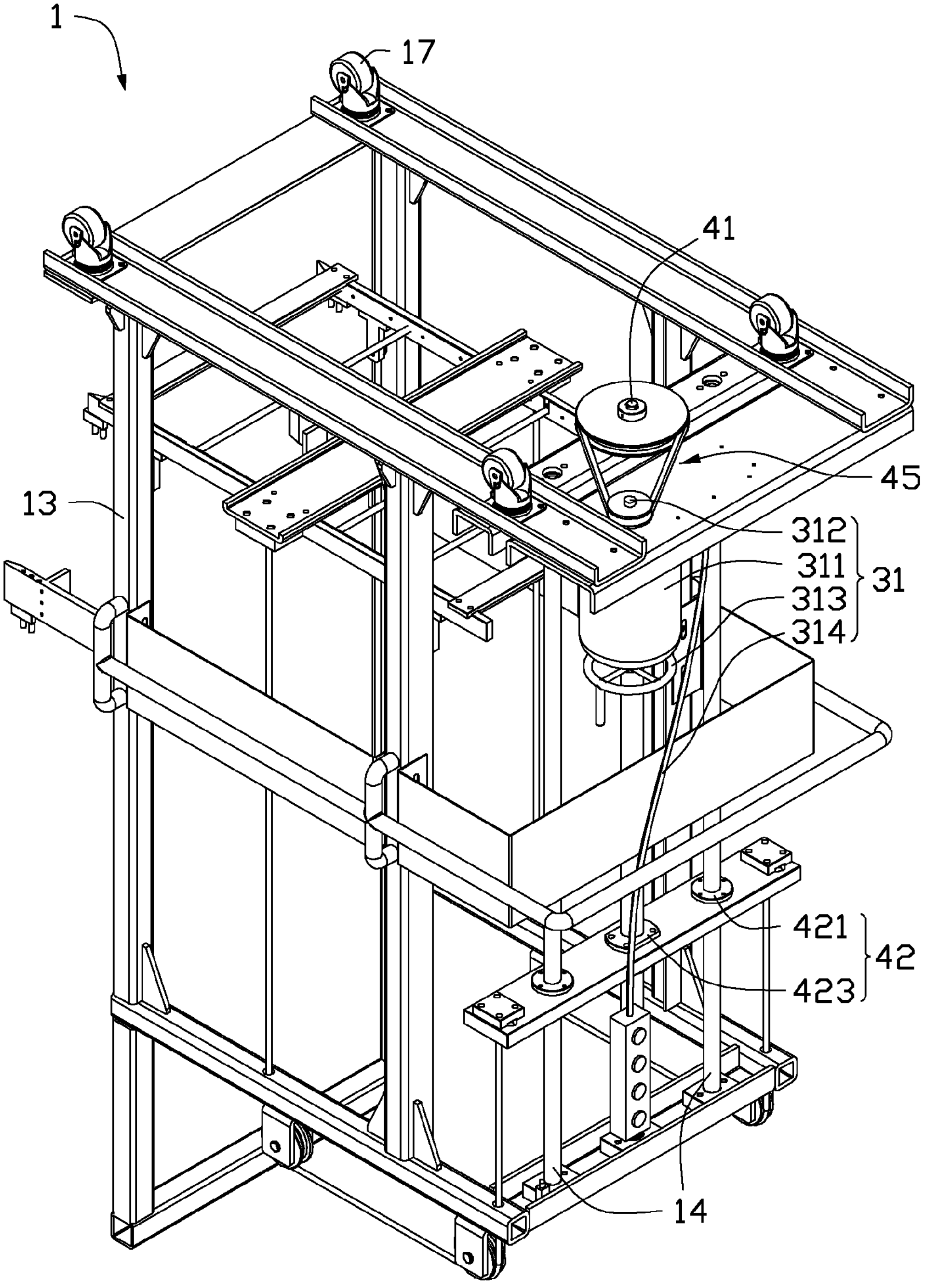
FIG. 2 is an isometric view of the cart of FIG. 1, viewed from a reverse perspective.

Referring to FIGS. 1 and 2, a cart 1 according to an exemplary embodiment is illustrated. The cart 1 includes a frame body 10 defining a receiving space 15, a tray 20 slidably received in the receiving space 15, a driving mechanism 30, and a transmission mechanism 40.

Figure 3:
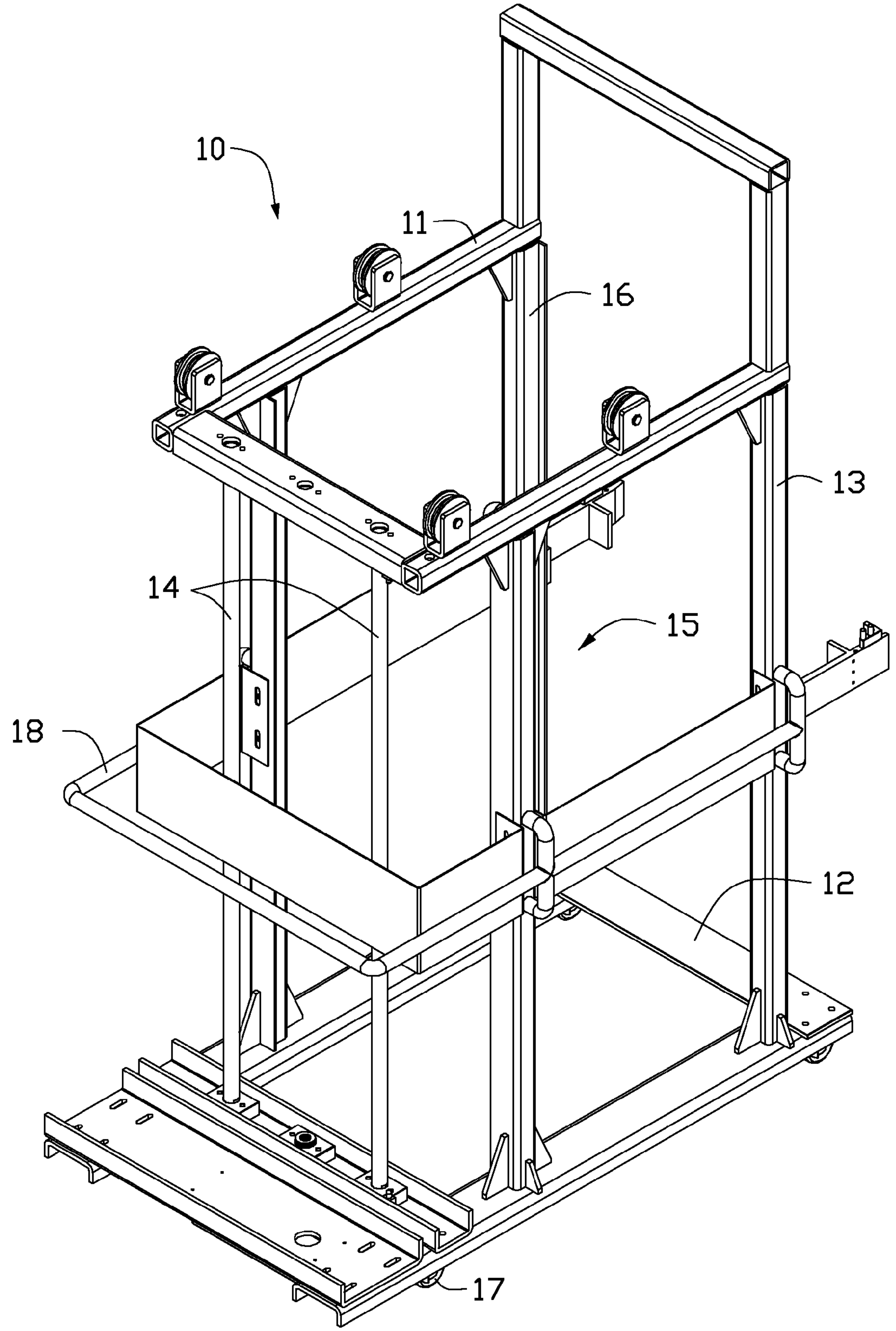
FIG. 3 is an isometric view of a main body of the cart of FIG. 1.

Referring to FIG. 3, the frame body 10 includes a top portion 11, a bottom portion 12, four connecting bars 13, and two guide bars 14. Two opposite ends of each connecting bar 13 and each guide bar 14 are respectively connected to the top portion 11 and the bottom portion 12, which cooperatively define the receiving space 15 for the tray 20. Each connecting bar 13 defines a sliding groove 16 extending along a longitudinal direction thereof. The frame body 10 further includes four castors 17 fixed to the bottom portion 12 and a handle 18 fixed to the connecting bars 13. A user can thus hold the handle 18 and push the cart 1 to move.

Figure 4:
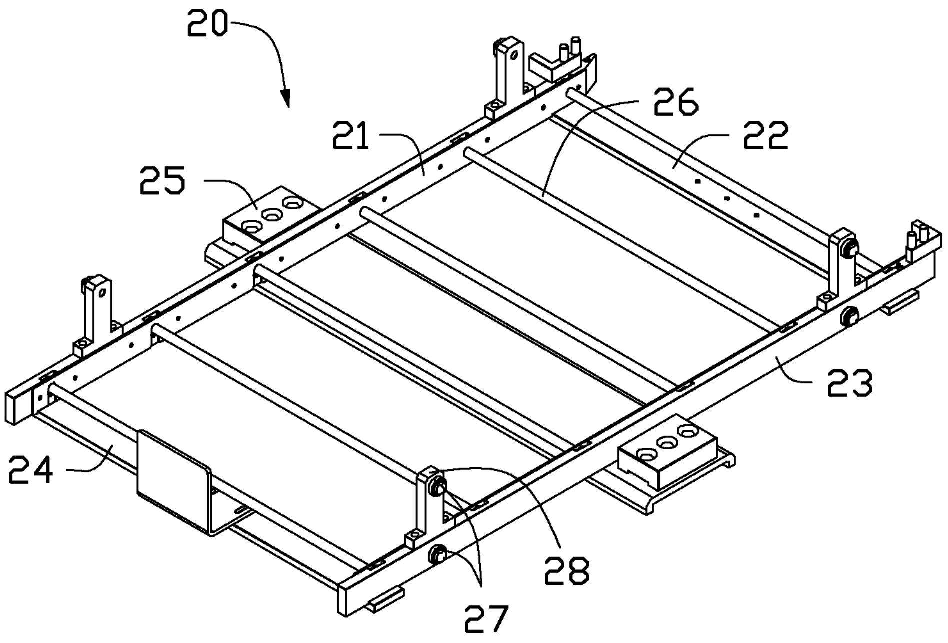
FIG. 4 is an isometric view of a tray of the cart of FIG. 1.

Referring to FIG. 4, the tray 20 includes a first connecting rod 21, a second connecting rod 22, a third connecting rod 23, and a fourth connecting rod 24 successively connected to each other. The first connecting rod 21 extends parallel to the third connecting rod 23, and the second connecting rod 22 extends parallel to the fourth connecting rod 24. The tray 20 further includes a middle board 25 and a number of support rods 26 between the first connecting rod 21 and the third connecting rod 23 for supporting a workpiece. Two opposite ends of the middle board 25 are respectively fixed to bottoms of the first connecting rod 21 and the third connecting rod 23. In the embodiment, two opposite ends of each support rod 26 are rotatably connected to the first connecting rod 21 and the third connecting rod 23 correspondingly, and thus little effort is required for users to move the workpiece via rotating the support rods 26.

The tray 20 further includes a number of bearings 27 and four supports 28 protruding from the connecting rods 21 and 23. In the embodiment, some of the bearings 27 are rotatably connected to the connecting rods 21 and 23, and the others are rotatably connected to the supports 28. The bearings 27 are respectively received and can roll in the sliding grooves 16 of the frame body 10. Therefore, the tray 20 can move up and down along the sliding grooves 16 in the receiving space 15 of the frame body 10.

The driving mechanism 30 includes a motor 31 and an inverter 32. The motor 31 is connected to a power source via the inverter 32. The motor 31 includes a cylindrical housing 311, an output shaft 312, and a controller 314. The housing 311 accommodates required electronic and mechanical components. The controller 314 and the inverter 32 are used to adjust the rotating speed of the output shaft 312. In the embodiment, the motor 31 further includes a wheel 313 for manually rotating the output shaft 312.

The transmission mechanism 40 includes a screw shaft 41, a driving board 42, two pairs of pulleys 43, and two ropes 44. The driving board 42 includes two guide sleeves 421 allowing the two guide bars 14 to extend therethrough, and a nut 423. The screw shaft 41 engages with the nut 423, and can thus drive the driving board 42 to move. One end of the screw shaft 41 is connected to the output shaft 312 of the motor 31 via a connecting means 45, such as a belt transmission device. Each pair of pulleys 43 are positioned on the top portion 11 of the frame body 10. The two ropes 44 are respectively wound around one pair of pulleys 43. Two opposite ends of the rope 44 are respectively fixed to the driving board 42 and the middle board 25 of the tray 20. The driving board 42 and the middle board 25 together with the rope 44 and the pulleys 43 form a rope and pulley system.

To adjust the height of the tray 20, the motor 31 is actuated and the output shaft 312 drives the screw shaft 41 to rotate. The driving board 42 thus moves along the guide bar 14, causing the rope 44 to pull the tray 20 to move up or down.

While various embodiments have been described and illustrated, the disclosure is not to be constructed as being limited thereto. Various modifications can be made to the embodiments by those skilled in the art without departing from the true spirit and scope of the disclosure as defined by the appended claims.

What is claimed is:

1. A cart comprising:

a frame body comprising a top portion, a bottom portion comprising a plurality of castors, and a plurality of connecting bars between the top portion and the bottom portion, which cooperatively defines a receiving space;

a tray slidably received in the receiving space for supporting a workpiece;

a transmission mechanism comprising:

a screw shaft;

a driving board comprising a nut engaging with the screw shaft, allowing the driving board to slide along the screw shaft;

at least one pair of pulleys mounted on the top portion of the main body and aligned with each other; and at least one rope wound around the at least one pair of pulleys and comprising two opposite ends respectively fixed to the driving board and the tray; and a driving mechanism configured to drive the screw shaft to rotate, the driving board thus sliding along the screw shaft, causing the tray to move up or down for adjusting a height of the tray.

2. The cart as described in claim 1, wherein the frame body further comprises a handle fixed to the connecting bars.

3. The cart as described in claim 1, wherein the tray comprises a first connecting rod, a second connecting rod, a third connecting rod, a fourth connecting rod successively connected to each other, and a plurality of support rods each with two opposite ends respectively connected to bottoms of the first connecting rod and the third connecting rod.

4. The cart as described in claim 3, wherein the two opposite ends of each of the support rods are rotatably and correspondingly connected to the first connecting rod and the third connecting rod.

5. The cart as described in claim 3, wherein each of the connecting bars defines a sliding groove extending along a longitudinal direction thereof, and the tray comprises a plurality of bearings correspondingly retained within the sliding grooves of the frame body.

6. The cart as described in claim 1, wherein the tray further comprises a middle board fixed therewith, and one end of the at least one rope is fixed to the middle board.

7. The cart as described in claim 1, wherein the driving mechanism comprises a motor comprising a controller and an output shaft rotatably connected with one end of the screw shaft, and the controller is configured to adjust the rotating speed of the output shaft.

8. The cart as described in claim 7, wherein the driving mechanism further comprises a wheel for manually rotating the output shaft.

9. The cart as described in claim 7, wherein the driving mechanism further comprises an inverter to adjust the rotating speed of the output shaft.

* * * * *